United States Patent
Nonaka (10) Patent No.: US 12,030,347 B2
(45) Date of Patent: Jul. 9, 2024

(54) MOTORCYCLE TIRE SET

(71) Applicant: Sumitomo Rubber Industries, Ltd., Kobe (JP)

(72) Inventor: Kenji Nonaka, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

(21) Appl. No.: 18/096,821

(22) Filed: Jan. 13, 2023

(65) Prior Publication Data

US 2023/0271461 A1 Aug. 31, 2023

(30) Foreign Application Priority Data

Feb. 28, 2022 (JP) .................................. 2022-029739
Oct. 7, 2022 (JP) .................................. 2022-162541

(51) Int. Cl.
| | | |
|---|---|---|
| B60C 19/00 | (2006.01) | |
| B60C 9/02 | (2006.01) | |
| B60C 9/04 | (2006.01) | |
| B60C 9/06 | (2006.01) | |
| B60C 11/00 | (2006.01) | |

(52) U.S. Cl.
CPC ............ B60C 19/001 (2013.01); B60C 9/023 (2013.01); B60C 9/0238 (2013.01); B60C 9/04 (2013.01); B60C 9/06 (2013.01); B60C 11/0058 (2013.01); *B60C 2009/0276* (2013.01); *B60C 2011/0016* (2013.01); *B60C 2200/10* (2013.01)

(58) Field of Classification Search
CPC ............. B60C 2200/10; B60C 19/001; B60C 11/0008; B60C 11/0041; B60C 11/005; B60C 11/0058; B60C 11/0066; B60C 11/0075; B60C 2011/0016
See application file for complete search history.

(56) References Cited

U.S. PATENT DOCUMENTS

2020/0331298 A1  10/2020  Isaka

FOREIGN PATENT DOCUMENTS

| EP | 3 789 218 A1 | 3/2021 |
|---|---|---|
| JP | H0325005 | * 2/1991 |

(Continued)

OTHER PUBLICATIONS

Extended European Search Report for European Application No. 23151225.2, dated Jun. 30, 2023.

*Primary Examiner* — Cedrick S Williams
*Assistant Examiner* — Thomas Frank Schneider
(74) *Attorney, Agent, or Firm* — Birch, Stewart, Kolasch & Birch, LLP (57) ABSTRACT

A motorcycle tire set includes a front-wheel tire and a rear-wheel tire. Each of the front and rear-wheel tires includes a carcass, a band layer arranged radially outwardly of the carcass in the tread portion, and a tread rubber arranged radially outwardly of the band layer. The carcass includes a carcass ply including carcass cords. The band layer includes a jointless band ply in which a band cord is circumferentially wound spirally at an angle equal to or less than 5 degrees. The tread rubber includes a crown rubber portion. An angle θ1 of the carcass cords of the front-wheel tire is 65 degrees or more with respect to the tire circumferential direction. A rubber hardness of the crown rubber portion of the rear-wheel tire is greater than a rubber hardness of the crown rubber portion of the front-wheel tire.

15 Claims, 4 Drawing Sheets

(56) References Cited

FOREIGN PATENT DOCUMENTS

| JP | 2001-138706 | A | | 5/2001 | |
|----|---|---|---|---|---|
| JP | 2008143351 | A | * | 6/2008 | ......... B60C 11/0058 |
| JP | 2009051428 | A | * | 3/2009 | |
| JP | 2010143538 | A | * | 7/2010 | |
| JP | 4976001 | B2 | | 7/2012 | |
| JP | 2020-175860 | A | | 10/2020 | |

* cited by examiner

MOTORCYCLE TIRE SET

RELATED APPLICATIONS

This application claims the benefit of foreign priority to Japanese Patent Applications No. JP2022-029739, filed Feb. 28, 2022, and No. JP2022-162541, filed Oct. 7, 2022, which are incorporated by reference in its entirety.

FIELD OF THE DISCLOSURE

The present disclosure is related to a motorcycle tire set.

BACKGROUND OF THE DISCLOSURE

Patent Document 1 below discloses a motorcycle tire set that includes a front-wheel tire and a rear-wheel tire. The front-wheel tire and the rear-wheel tire each include a toroidal carcass and a band layer arranged outwardly in the tire radial direction of the carcass. Each carcass has carcass cords oriented at an angle of from 20 to 70 degrees with respect to the tire circumferential direction. Each band layer includes a jointless band ply. The angle of the carcass cords of the front-wheel tire is smaller than the angle of the carcass cords of the rear-wheel tire. Such a motorcycle tire set can maintain ride comfort and exert excellent steering stability.

PATENT DOCUMENT

Patent Document 1

Japanese Unexamined Patent Application Publication 2020-175860

SUMMARY OF THE DISCLOSURE

In recent years, there has been a demand for improved high-speed stability performance and turning performance, especially in the sports category of motorcycle tire sets intended for circuit driving.

The present disclosure has been made in view of the above circumstances and has a major object to provide a motorcycle tire set capable of improving high-speed stability performance and turning performance.

In one aspect of the present disclosure, a motorcycle tire set includes a front-wheel tire; and a rear-wheel tire. Each of the front-wheel tire and the rear-wheel tire includes a tread portion, a toroidal carcass, a band layer arranged outwardly in a tire radial direction of the carcass in the tread portion, and a tread rubber arranged outwardly in the tire radial direction of the band layer. The carcass includes a carcass ply including a plurality of carcass cords. The band layer includes a jointless band ply in which a band cord is wound spirally in a tire circumferential direction at an angle equal to or less than 5 degrees. The tread rubber includes a crown rubber portion disposed in a tread crown region. An angle $\theta1$ of the plurality of carcass cords of the front-wheel tire is equal to or less than 65 degrees with respect to the tire circumferential direction. A rubber hardness $Hc2$ of the crown rubber portion of the rear-wheel tire is greater than a rubber hardness $Hc1$ of the crown rubber portion of the front-wheel tire.

DETAILED DESCRIPTION OF THE DISCLOSURE

Hereinafter, one or more embodiments of the present disclosure will be described below with reference to the drawings.

Figure 1:
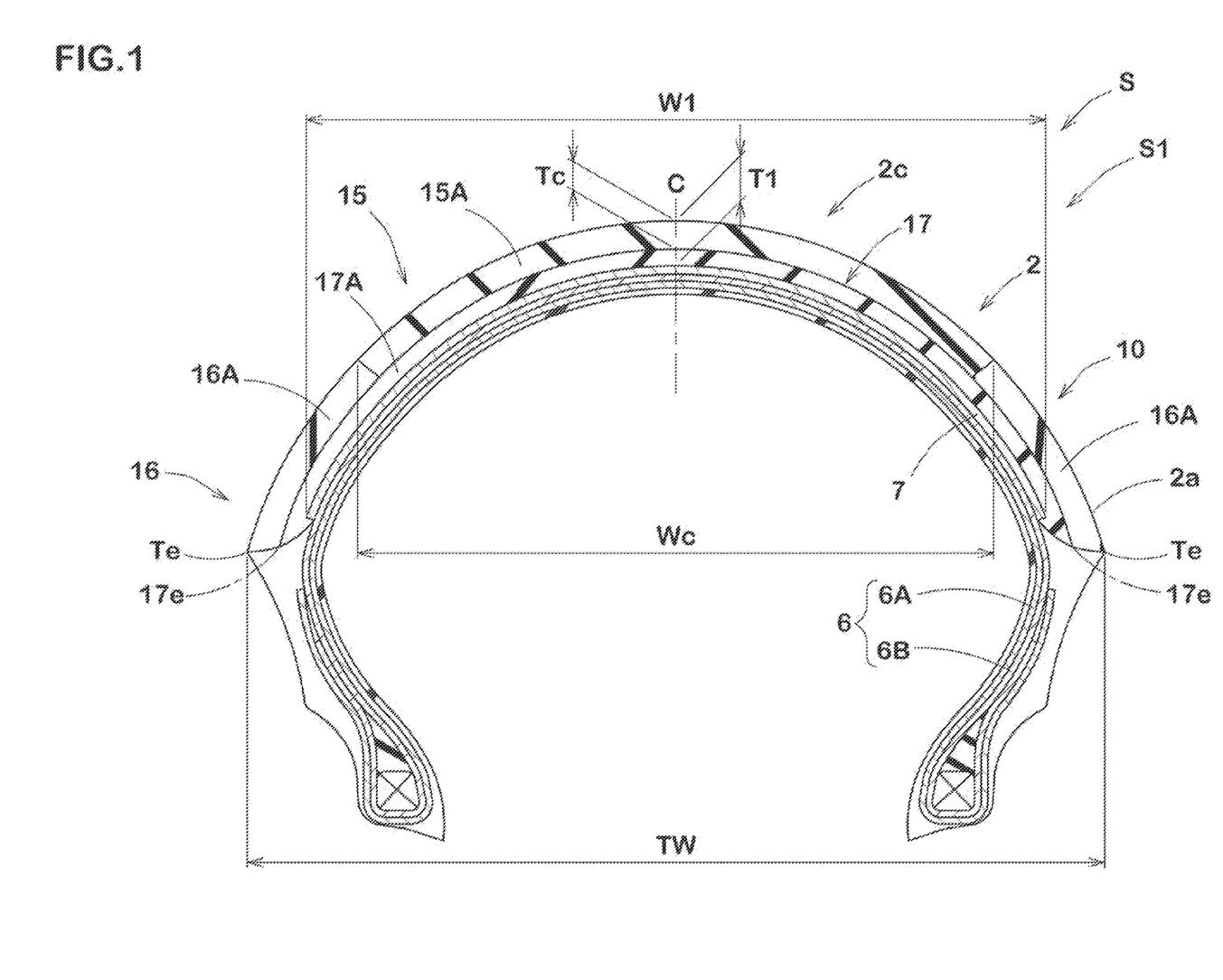
FIG. 1 is a tire meridian cross-sectional view of a front-wheel tire showing an embodiment of the present disclosure.
Figure 2:
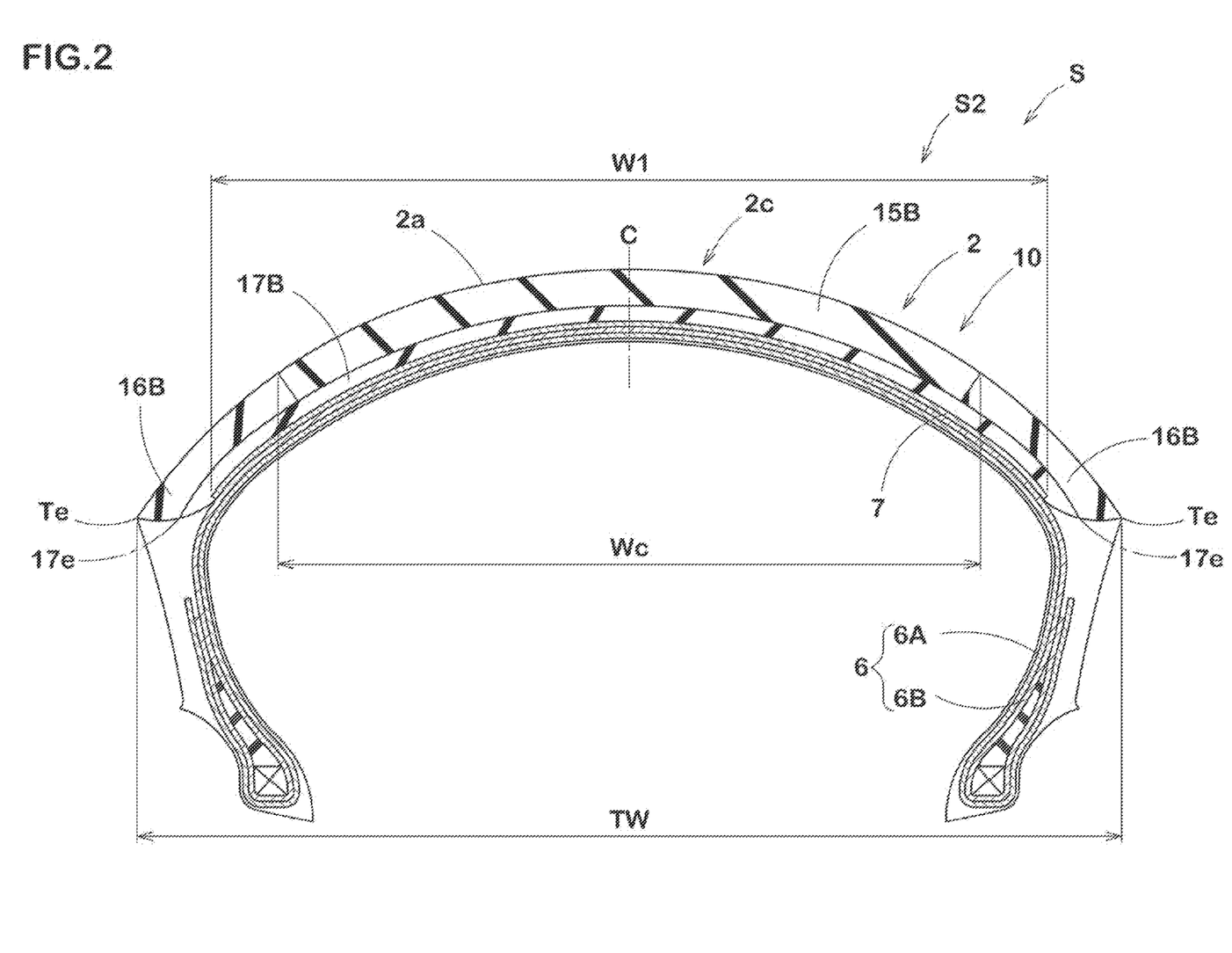
FIG. 2 is a tire meridian cross-sectional view of a rear-wheel tire showing an embodiment of the present disclosure.

FIG. 1 illustrates a tire meridian cross-sectional view of a front-wheel tire S1 showing an embodiment of a motorcycle tire set (hereinafter simply referred to as "tire set") S in accordance with the present disclosure. FIG. 2 illustrates a tire meridian cross-sectional view of a rear-wheel tire S2 showing an embodiment of the tire set S in accordance with the present disclosure. The tire set S according to the present embodiment is suitable for use, for example, in the sports category for circuit driving. However, the tire set S according to the present disclosure is not limited to such an aspect of use.

FIG. 1 and FIG. 2 show the front-wheel tire S1 and the rear-wheel tire S2 which are under a normal state. The "normal state" of a tire is such that the tire is mounted on a standard wheel rim with a standard pressure but loaded with no tire load. As used herein, unless otherwise noted, the dimensions of portions of each tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example. As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1 and FIG. 2, each of the front-wheel tire S1 and the rear-wheel tire S2 includes a tread portion 2. The tread portion 2 has an outer surface 2a between tread edges Te of the tread portion 2 which is curved in a convex manner to protrude outwardly in the tire radial direction. Here, a distance in the tire axial direction between the tread edges Te and Te is defined as the tread width TW.

In the present embodiment, each of the front-wheel tire S1 and the rear-wheel tire S2 includes toroidal carcass 6, a band layer 7 arranged outwardly in the tire radial direction of the carcass 6 in the tread portion 2, and a tread rubber 10 arranged outwardly in the tire radial direction of the band layer 7.

Figure 3:
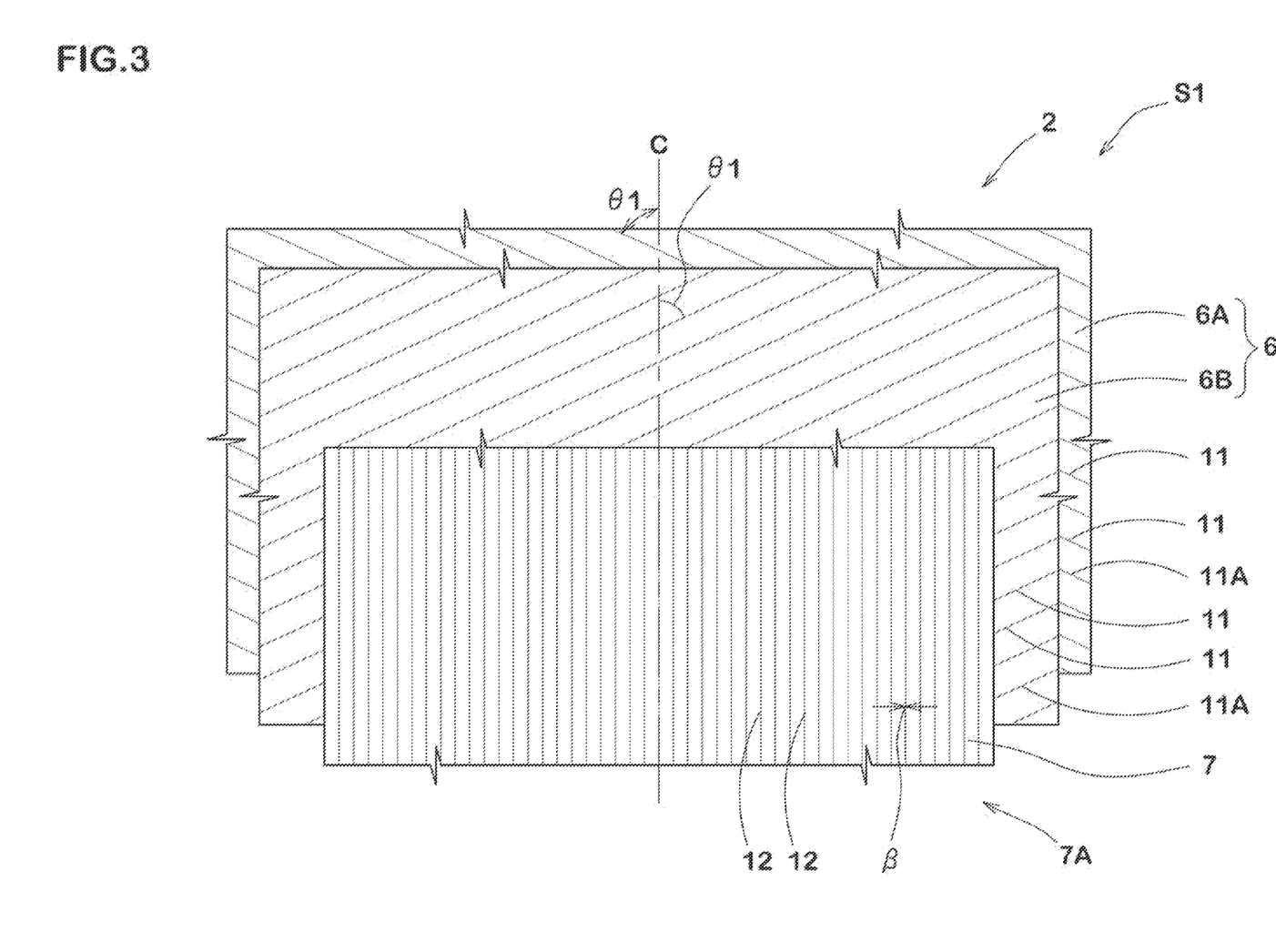
FIG. 3 is a development view of an internal structure of a tread portion of the front-wheel tire.
Figure 4:
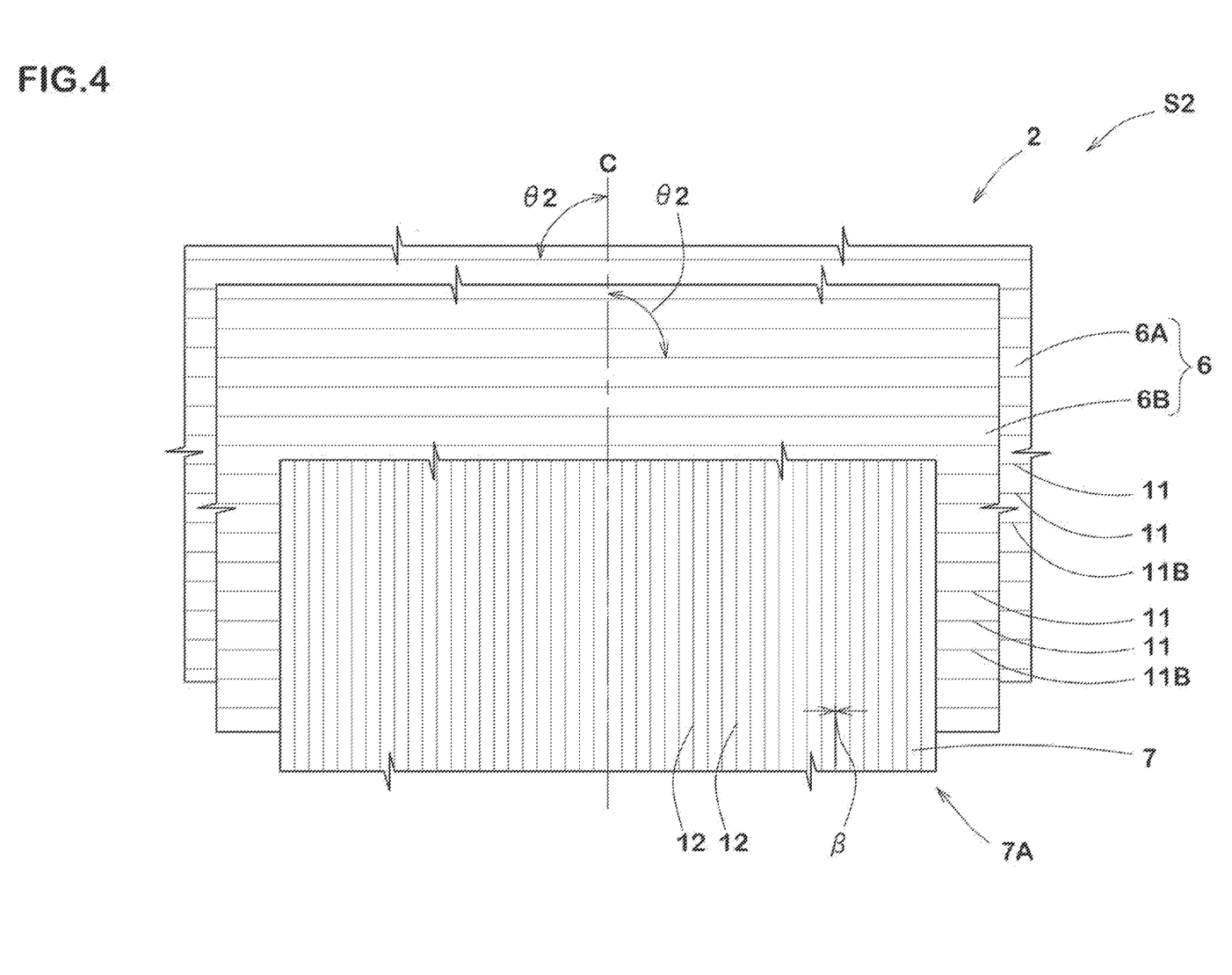
FIG. 4 is a development view of an internal structure of a tread portion of the rear-wheel tire.

FIG. 3 illustrates a development view of an internal structure of the tread portion 2 of the front-wheel tire S1. FIG. 4 illustrates a development view of an internal structure of the tread portion 2 of the rear-wheel tire S2. FIG. 3 and FIG. 4 illustrate the respective carcasses 6 and band layers 7. As illustrated in FIG. 1 to FIG. 4, each carcass 6 includes at least one carcass ply 6A which includes a plurality of carcass cords 11. As used herein, the carcass cords 11 of the front-wheel tire S1 may sometimes be referred to as "carcass cords 11A", and the carcass cords 11 of the rear-wheel tire S2 may sometimes be referred to as "carcass cords 11B". In the present embodiment, each carcass 6 is composed of two carcass plies 6A and 6B. In the front-wheel tire S1, the carcass plies 6A and 6B, for example, are superimposed such that the carcass cords 11 of the ply 6A cross the carcass cords 11 of the ply 6B. For the carcass cords 11, an organic fiber cord such as nylon, polyester, or rayon, for example, may be suitably employed.

An angle θ1 of the carcass cords 11A of the front-wheel tire S1 is equal to or less than 65 degrees with respect to the tire circumferential direction. This makes it possible to obtain a large camber thrust and can improve turning performance. When the angle θ1 becomes small, the ground-contacting shape of the front-wheel tire S1 tends to be smaller, and the responsiveness of steering operation may decrease, resulting in deterioration of turning performance and high-speed stability performance. Thus, the angle θ1 is preferably equal to or more than 20 degrees with respect to the tire circumferential direction.

Each band layer 7 includes a jointless band ply (JLB) 7A in which a band cord 12 is wound spirally in the tire circumferential direction at an angle β equal to or less than 5 degrees with respect to the tire circumferential direction. This can help to exert good high-speed stability performance. In the present embodiment, each band layer 7 is formed by a single jointless band ply 7A.

As illustrated in FIG. 1 and FIG. 2, each tread rubber 10 includes a crown rubber portion 15 arranged disposed in a tread crown region 2c. As used herein, the crown rubber portion 15 of the front-wheel tire S1 may sometimes be referred to as "crown rubber portion 15A", and the crown rubber portion 15 of the rear-wheel tire S2 may sometimes be referred to as "crown rubber portion 15B". A rubber hardness Hc2 of the crown rubber portion 15B of the rear-wheel tire S2 is greater than a rubber hardness Hc1 of the crown rubber portion 15A of the front-wheel tire S1. This can help lean the rear-wheel tire S2 easier and further improves the turning performance. Thus, the motorcycle tire set S according to the present disclosure can exhibit excellent high-speed stability and turning performance.

As used herein, a rubber hardness means the Durometer A hardness measured by Durometer Type A at 23 degrees C. based on JIS-K6253.

Preferably, the difference (Hc2−Hc1) between the rubber hardness Hc2 of the crown rubber portion 15B of the rear-wheel tire S2 and the rubber hardness Hc1 of the crown rubber portion 15A of the front-wheel tire S1 is in a range from 2 to 8. When the difference (Hc2−Hc1) is equal to or more than 2, the above-mentioned effects can be effectively demonstrated. When the difference (Hc2−Hc1) is equal to or less than 8, the difference in ease of leaning between the rear-wheel tire S2 and the front-wheel tire S1 is prevented from becoming excessively large, and high-speed stability performance and turning performance can be maintained high.

Although not limited, the rubber hardness Hc1 of the crown rubber portion 15A of the front-wheel tire S1 is preferably equal to or more than 55, more preferably equal to or more than 58, but preferably equal to or less than 68, more preferably equal to or less than 65.

Each of the tread rubbers 10 of the front-wheel tire S1 and the rear-wheel tire S2 includes a pair of shoulder rubber portions 16 arranged on both sides of the crown rubber portion 15. As used herein, the shoulder rubber portion 16 of the front-wheel tire S1 may sometimes be referred to as "shoulder rubber portion 16A", and the shoulder rubber portions 16 of the rear-wheel tire S2 may sometimes be referred to as "shoulder rubber portions 16B". In the present embodiment, each of the tread rubbers 10 of the front-wheel tire S1 and the rear-wheel tire S2 further includes a base rubber portion 17 arranged inwardly in the tire radial direction of the crown rubber portion 15 and the pair of shoulder rubber portions 16. As used herein, the base rubber portion 17 of the front-wheel tire S1 may sometimes be referred to as "base rubber portion 17A", and the base rubber portions 17 of the rear-wheel tire S2 may sometimes be referred to as "base rubber portions 17B".

In the rear-wheel tire S2, the rubber hardness Hc2 of the crown rubber portion 15B is different from the rubber hardness Hs2 of the pair of shoulder rubber portions 16B. This allows the crown rubber portion 15B and the shoulder rubber portions 16B to have different stiffness. Specifically, in the present embodiment, the rubber hardness Hs2 of the pair of shoulder rubber portions 16B is greater than the rubber hardness Hc2 of the crown rubber portion 15B. This can increase the camber thrust when turning with large camber angles and improve the turning performance. In the rear-wheel tire S2, the difference (Hs2−Hc2) between the rubber hardness Hs2 of the pair of shoulder rubber portions 16B and the rubber hardness Hc2 of the crown rubber portion 15B is preferably equal to or more than 1, more preferably equal to or more than 2, but preferably equal to or less than 5 degrees, more preferably equal to or less than 3.

In the front-wheel tire S1, the rubber hardness Hc1 of the crown rubber portion 15A is different from the rubber hardness Hs1 of the pair of shoulder rubber portions 16A. Specifically, in the present embodiment, the rubber hardness Hc1 of the crown rubber portion 15A is greater than the rubber hardness Hs1 of the pair of shoulder rubber portions 16A. This can improve the turning performance while maintaining high-speed stability in straight driving. In the front-wheel tire S1, the difference (Hc1−Hs1) between the rubber hardness Hc1 of the crown rubber portion 15A and the rubber hardness Hs1 of the pair of shoulder rubber portions 16A is preferably equal to or more than 1, more preferably equal to or more than 2, but preferably equal to or less than 5, more preferably equal to or less than 3.

In the front-wheel tire S1, the rubber hardness Hb1 of the base rubber portion 17A is different from the rubber hardness Hc1 of the crown rubber portion 15A and the rubber hardness Hs1 of the pair of shoulder rubber portions 16A. In the present embodiment, the rubber hardness Hb1 of the base rubber portion 17A is smaller than the rubber hardness Hc1 of the crown rubber portion 15A and the rubber hardness Hs1 of the pair of shoulder rubber portions 16A. As a result, in the base rubber portion 17A of the front-wheel tire S1, the amount of heat generated by the tread rubber 10 due to running can be secured, and turning performance can be improved.

In the rear-wheel tire S2, the rubber hardness Hb2 of the base rubber portion 17B is different from the rubber hardness Hc2 of the crown rubber portion 15B and the rubber hardness Hs2 of the pair of shoulder rubber portions 16B. In the present embodiment, the rubber hardness Hb2 of the base rubber portion 17B is smaller than the rubber hardness Hc2 of the crown rubber portion 15B and the rubber hardness Hs2 of the pair of shoulder rubber portions 16B. As a result, in the base rubber portion 17B of the rear-wheel tire S2, the amount of heat generated by the tread rubber 10 due to running can be secured, and turning performance can be improved.

Although not particularly limited, in the front-wheel tire S1, the rubber hardness Hb1 of the base rubber portion 17A is preferably equal to or more than 55, more preferably equal to or more than 60, but preferably equal to or less than 70, more preferably equal to or less than 65. Similarly, in the rear-wheel tire S2, the rubber hardness Hb2 of the base rubber portion 17B is preferably equal to or more than 55, more preferably equal to or more than 60, but preferably equal to or less than 70, more preferably equal to or less than 65.

Each crown rubber portion 15, for example, extends to both sides in the tire axial direction centering on the tire equator C. A width We in the tire axial direction of each crown rubber portion 15, for example, is equal to or more than 20% of the tread width TW, more preferably equal to or more than 30%, but preferably equal to or less than 80% of the tread width TW, more preferably equal to or less than 70%. Each base rubber portion 17 has a width in the tire axial direction greater than that of the band layer 7 and has outer ends 17e outside the band layer 7 in the tire axial direction.

Although not particularly limited, a thickness Tc of each crown rubber portion 15 is preferably equal to or more than 40% of a thickness T1 of the tread rubber portion 10, more preferably equal to or more than 50%, but preferably equal to or less than 95% of the thickness T1, more preferably equal to or less than 90%. Here, the thickness Tc of the crown rubber portion 15 and the thickness T1 of the tread rubber 10 are measured on the tire equator C.

As illustrated in FIG. 3 and FIG. 4, the angle θ1 of the carcass cords 11A with respect to the tire circumferential direction of the front-wheel tire S1 is smaller than the angle θ2 of the carcass cords 11B with respect to the tire circumferential direction of the rear-wheel tire S2. This can help lean the front-wheel tire S1 easier and further improves the turning performance.

In order to effectively exhibit the above effect, the difference (θ2−θ1) between the angle θ2 of the carcass cords 11B and the angle θ1 of the carcass cords 11A is preferably equal to or more than 15 degrees, more preferably equal to or more than 20 degrees. When the difference (θ2−θ1) becomes excessively large, the angle θ1 of the carcass cords 11A of the front-wheel tire S1 tends to become small, and turning performance and high-speed stability may deteriorate. Thus, the difference (θ2−θ1) is preferably equal to or less than 60 degrees, more preferably equal to or less than 30 degrees. The angles θ1 and θ2 are angles at the tire equator C. The angle θ2 of the carcass cords 11B is preferably equal to or more than 80 degrees, more preferably equal to or more than 85 degrees.

An axial width W1 of the band layer 7 is preferably equal to or more than 60% of the tread width TW, more preferably equal to or more than 65%, but preferably equal to or less than 100% of the tread width TW, more preferably equal to or less than 95%.

The tread rubber 10 of the front-wheel tire S1 may, for example, be formed only by the crown rubber portion 15A and the pair of shoulder rubber portions 16A. The tread rubber 10 of the rear-wheel tire S2 may, for example, be formed only of the crown rubber portion 15B and the pair of shoulder rubber portions 16B, or may be formed only of the crown rubber portion 15B.

While the particularly preferable embodiments in accordance with the present disclosure have been described in detail, the present disclosure is not limited to the illustrated embodiments but can be modified and carried out in various aspects within the scope of the disclosure.

Example

Motorcycle tire sets having the basic structure shown in FIGS. 1 to 4 were prepared. Then, the high-speed stability performance and turning performance of each test tire set were tested. The common specifications and test methods for each test tire set are as follows.

Front-wheel tire (size and rim size): 120/70R17, 3.50MT
Rear-wheel tire (size and rim): 180/55R17, 5.50MT
Rubber hardness of crown rubber portion Hc1 of front-wheel tire: 60

In References 1 to 3 and Examples 1, 2, and 5 to 7, each tread rubber of the front-wheel tire was formed only by the crown rubber portion, and each rear-wheel tire was formed only by the crown rubber portion and the pair of shoulder rubber portions. In Example 3, each tread rubber of the front and rear-wheel tires was formed only by the crown rubber portion and the pair of shoulder rubber portions. In Example 4, each tread rubber of the front and rear-wheel tires was formed by the crown rubber portion, the pair of shoulder rubber portions, and the base rubber portion.

High-Speed Stability and Turning Performance Test:

Each test tire set filled with a standard pressure was mounted on a motorcycle (displacement 1500 cc). Then, a test rider ran the motorcycle on a test course with a dry asphalt surface, and the degree of vibration and shaking during high-speed straight running, and the agility and steering performance during turning, were evaluated by the rider's sensory perception. The test results are indicated in Table 1 on a 5-point score with a maximum score of 5 points. For each performance, the larger the value, the better.

Table 1 shows the test results.

TABLE 1

| | Ref. 1 | Ref. 2 | Ref. 3 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Jointless bands of front and rear-wheel tires | none | applied | applied | applied | applied | applied | applied | applied | applied | applied | applied |
| Difference (Hc2 − Hc1) | 0 | 0 | 0 | 5 | 5 | 5 | 5 | 5 | 5 | 5 | 5 |
| Angle θ1 of carcass cords of front-wheel tire (deg.) | 90 | 90 | 90 | 65 | 65 | 65 | 65 | 45 | 30 | 20 | 30 |
| Angle θ2 of carcass cords of rear-wheel tire (deg.) | 75 | 75 | 75 | 75 | 90 | 90 | 90 | 85 | 85 | 85 | 45 |
| Difference (Hs2 − Hc2) | — | — | — | — | — | 3 | 3 | — | — | — | — |
| Rubber hardness Hb1 | — | — | — | — | — | — | 60 | — | — | — | — |
| Rubber hardness Hb2 | — | — | — | — | — | — | 60 | — | — | — | — |
| High-speed durability performance [score: Larger is better.] | 3.50 | 3.75 | 3.90 | 3.90 | 4.00 | 4.00 | 4.00 | 4.10 | 4.10 | 3.90 | 4.00 |
| Turning performance [score: Larger is better.] | 3.50 | 3.30 | 3.50 | 3.65 | 3.75 | 3.95 | 4.10 | 4.20 | 4.30 | 4.10 | 4.10 |

As a result of the test, it is understood that the tire sets of the Examples can improve high-speed stability performance and turning performance compared to the tire sets of References.

[Additional Note]

The present disclosure includes the following aspects.

[Note 1]

A motorcycle tire set comprising:
a front-wheel tire; and
a rear-wheel tire,
wherein
each of the front-wheel tire and the rear-wheel tire comprises a tread portion, a toroidal carcass, a band layer arranged outwardly in a tire radial direction of the carcass in the tread portion, and a tread rubber arranged outwardly in the tire radial direction of the band layer,
the carcass comprises a carcass ply comprising a plurality of carcass cords,
the band layer comprises a jointless band ply in which a band cord is wound spirally in a tire circumferential direction at an angle equal to or less than 5 degrees, and
the tread rubber comprises a crown rubber portion disposed in a tread crown region,
wherein
an angle $\theta1$ of the plurality of carcass cords of the front-wheel tire is equal to or less than 65 degrees with respect to the tire circumferential direction, and
a rubber hardness Hc2 of the crown rubber portion of the rear-wheel tire is greater than a rubber hardness Hc1 of the crown rubber portion of the front-wheel tire.

[Note 2]

The motorcycle tire set according to note 1, wherein
a difference (Hc2−Hc1) between the rubber hardness Hc2 of the crown rubber portion of the rear-wheel tire and the rubber hardness Hc1 of the crown rubber portion of the front-wheel tire is in a range from 2 to 8.

[Note 3]

The motorcycle tire set according to note 1 or 2, wherein
the angle $\theta1$ of the plurality of carcass cords of the front-wheel tire is smaller than an angle $\theta2$ of the plurality of carcass cords of the rear-wheel tire with respect to the tire circumferential direction.

[Note 4]

The motorcycle tire set according to note 3, wherein
a difference ($\theta2-\theta1$) between the angle $\theta2$ of the plurality of carcass cords of the rear-wheel tire and the angle $\theta1$ of the plurality of carcass cords of the front-wheel tire is equal to or more than 15 degrees.

[Note 5]

The motorcycle tire set according to any one of notes 1 to 4, wherein
each of the front-wheel tire and the rear-wheel tire further comprises a pair of shoulder rubber portions arranged on both sides of crown rubber portions in a tire axial direction, and
in the rear-wheel tire, a rubber hardness of the crown rubber portion is different from a rubber hardness of the pair of the shoulder rubber portions.

[Note 6]

The motorcycle tire set according to note 5, wherein
each of the front-wheel tire and the rear-wheel tire further comprises a base rubber portion arranged inwardly in the tire radial direction of the crown rubber portion and the pair of shoulder rubber portions, and
a rubber hardness of the base rubber is different from the rubber hardness of the crown rubber portion and the rubber hardness of the pair of shoulder rubber portions.

The invention claimed is:

1. A motorcycle tire set comprising:
a front-wheel tire; and
a rear-wheel tire,
wherein
each of the front-wheel tire and the rear-wheel tire comprises a tread portion, a toroidal carcass, a band layer arranged outwardly in a tire radial direction of the carcass in the tread portion, and a tread rubber arranged outwardly in the tire radial direction of the band layer,
the carcass comprises a carcass ply comprising a plurality of carcass cords,
the band layer comprises a jointless band ply in which a band cord is wound spirally in a tire circumferential direction at an angle equal to or less than 5 degrees, and
the tread rubber comprises an outer surface between tread edges,
the outer surface of the tread rubber consists of
a crown rubber portion formed of a rubber material and disposed in a tread crown region so as to cross a tire equator, and
a pair of shoulder rubber portions formed of a rubber material different from the rubber material of the crown rubber portion and each extending in a tire axial direction from the crown rubber portion to a respective one of the tread edges,
wherein
an angle $\theta1$ of the plurality of carcass cords of the front-wheel tire is equal to or less than 65 degrees with respect to the tire circumferential direction,
a rubber hardness Hc2 of the crown rubber portion of the rear-wheel tire is greater than a rubber hardness Hc1 of the crown rubber portion of the front-wheel tire,
in the front-wheel tire, the rubber hardness Hc1 of the crown rubber portion is greater than a rubber hardness Hs1 of the pair of shoulder rubber portions,
in the rear-wheel tire, a rubber hardness Hs2 of the pair of shoulder rubber portions is greater than the rubber hardness Hc2 of the crown rubber portion, and
the rubber hardness Hc1 of the crown rubber portion of the front-wheel tire ranges from 58 to 68.

2. The motorcycle tire set according to claim 1, wherein a difference (Hc2−Hc1) between the rubber hardness Hc2 of the crown rubber portion of the rear-wheel tire and the rubber hardness Hc1 of the crown rubber portion of the front-wheel tire is in a range from 2 to 8.

3. The motorcycle tire set according to claim 1, wherein the angle $\theta1$ of the plurality of carcass cords of the front-wheel tire is smaller than an angle $\theta2$ of the plurality of carcass cords of the rear-wheel tire with respect to the tire circumferential direction.

4. The motorcycle tire set according to claim 3, wherein a difference ($\theta2-\theta1$) between the angle $\theta2$ of the plurality of carcass cords of the rear-wheel tire and the angle $\theta1$ of the plurality of carcass cords of the front-wheel tire is equal to or more than 15 degrees.

5. The motorcycle tire set according to claim 1, wherein
each of the front-wheel tire and the rear-wheel tire further comprises a base rubber portion arranged inwardly in the tire radial direction of the crown rubber portion and the pair of shoulder rubber portions, and
a rubber hardness of the base rubber portion of each of the front and rear wheel tires is different from the rubber hardness of the crown rubber portion and the rubber hardness of the pair of shoulder rubber portions of each of the front and rear wheel tires.

6. The motorcycle tire set according to claim 1, wherein a difference (Hs2−Hc2) between the rubber hardness Hs2 of the pair of shoulder rubber portions and the rubber hardness Hc2 of the crown rubber portion ranges from 1 to 5.

7. The motorcycle tire set according to claim 1, wherein a difference (Hc1−Hs1) between the rubber hardness Hc1 of the crown rubber portion and the rubber hardness Hs1 of the pair of shoulder rubber portions ranges from 1 to 5.

8. The motorcycle tire set according to claim 5, wherein a rubber hardness of the base rubber portion of each of the front and rear wheel tires ranges from 55 to 70.

9. The motorcycle tire set according to claim 1, wherein the crown rubber portion of the rear wheel tires ranges from 55 to 70.

10. The motorcycle tire set according to claim 1, wherein the crown rubber portion of each of the front and rear wheel tires has a width in a tire axial direction in a range from 20% to 80% of a tread width.

11. The motorcycle tire set according to claim 3, wherein the angle $\theta 1$ of the plurality of carcass cords of the front-wheel tire ranges from 20 to 65 degrees, and the angle $\theta 2$ of the plurality of carcass cords of the rear-wheel tire is equal to or more than 80 degrees.

12. The motorcycle tire set according to claim 4, wherein the angle $\theta 1$ of the plurality of carcass cords of the front-wheel tire ranges from 20 to 65 degrees, and the angle $\theta 2$ of the plurality of carcass cords of the rear-wheel tire is equal to or more than 80 degrees.

13. The motorcycle tire set according to claim 12, wherein a difference ($\theta 2 - \theta 1$) between the angle $\theta 2$ of the plurality of carcass cords of the rear-wheel tire and the angle $\theta 1$ of the plurality of carcass cords of the front-wheel tire is equal or less than 60 degrees.

14. The motorcycle tire set according to claim 12, wherein a difference ($\theta 2 - \theta 1$) between the angle $\theta 2$ of the plurality of carcass cords of the rear-wheel tire and the angle $\theta 1$ of the plurality of carcass cords of the front-wheel tire is equal or less than 30 degrees.

15. The motorcycle tire set according to claim 1, wherein the band layer has a width in a tire axial direction in a range from 60% to 100% of a tread width.

* * * * *